US010436957B2

(12) United States Patent
Tabirian et al.

(10) Patent No.: US 10,436,957 B2
(45) Date of Patent: Oct. 8, 2019

(54) BROADBAND IMAGING WITH DIFFRACTIVE WAVEPLATE COATED MIRRORS AND DIFFRACTIVE WAVEPLATE OBJECTIVE LENS

(71) Applicant: Beam Engineering for Advanced Measurements Co., Orlando, FL (US)

(72) Inventors: Nelson V. Tabirian, Winter Park, FL (US); Zhi J. Liao, Apopka, FL (US); David E. Roberts, Apopka, FL (US)

(73) Assignee: Beam Engineering for Advanced Measurements Co., Orlando, FL (US)

(*) Notice: Subject to any disclaimer, the term of this patent is extended or adjusted under 35 U.S.C. 154(b) by 359 days.

(21) Appl. No.: 15/336,336

(22) Filed: Oct. 27, 2016

(65) Prior Publication Data

US 2017/0115435 A1 Apr. 27, 2017

Related U.S. Application Data

(60) Provisional application No. 62/246,923, filed on Oct. 27, 2015.

(51) Int. Cl.
*G02B 1/10* (2015.01)
*G02B 5/18* (2006.01)
(Continued)

(52) U.S. Cl.
CPC ............. *G02B 5/1833* (2013.01); *G02B 1/10* (2013.01); *G02B 5/1842* (2013.01);
(Continued)

(58) Field of Classification Search
CPC .............. G02B 1/10; G02B 5/18–1895; G02B 5/3083; G02B 5/3091; G02B 5/32;
(Continued)

(56) References Cited

U.S. PATENT DOCUMENTS

| 2,435,616 A | 2/1948 | Vittum |
| 3,721,486 A | 3/1973 | Bramley |

(Continued)

FOREIGN PATENT DOCUMENTS

| EP | 1970734 | 9/2008 |
| EP | 2088456 | 12/2009 |

(Continued)

OTHER PUBLICATIONS

M. Honma, T. Nose, Polarization-independent liquid crystal grating fabricated by microrubbing process, Jpn. J. Appl. Phys., Part 1, vol. 42, Nov. 2003, 3 pages.

(Continued)

*Primary Examiner* — Stephone B Allen
*Assistant Examiner* — Ryan S Dunning
(74) *Attorney, Agent, or Firm* — Brian S. Steinberger; Hilary F. Steinberger; Law Offices of Brian S. Steinberger, P.A.

(57) ABSTRACT

Diffractive waveplate lenses, mirrors, devices, systems and methods for performing imaging over a broad spectral band in imaging systems, such as but not limited to astronomical imaging, surveillance imaging, and in communication systems, such as laser communication systems. Corrector mirrors are used with a flat diffractive wave diffractive waveplate lens so that chromatic aberrations of the diffractive waveplate lens are reduced with the imaging system.

14 Claims, 7 Drawing Sheets

(51) Int. Cl.

| | | |
|---|---|---|
| *G02B 5/30* | (2006.01) | |
| *G02B 13/00* | (2006.01) | |
| *G02B 23/02* | (2006.01) | |
| *G02B 27/42* | (2006.01) | |
| *G02B 27/00* | (2006.01) | |
| G02B 7/00 | (2006.01) | |
| G02B 7/02 | (2006.01) | |
| G02B 7/182 | (2006.01) | |
| G03H 1/08 | (2006.01) | |

(52) U.S. Cl.
CPC ....... *G02B 5/3083* (2013.01); *G02B 13/0055* (2013.01); *G02B 23/02* (2013.01); *G02B 27/0037* (2013.01); *G02B 27/4211* (2013.01); *G02B 27/4261* (2013.01); G02B 7/003 (2013.01); G02B 7/02 (2013.01); G02B 7/1822 (2013.01); G02B 27/0012 (2013.01); G02B 27/4288 (2013.01); G03H 2001/0816 (2013.01); G03H 2240/53 (2013.01)

(58) Field of Classification Search
CPC .......... G02B 7/003; G02B 7/02; G02B 7/023; G02B 7/182; G02B 7/1822; G02B 13/0055; G02B 13/0065–008; G02B 13/14–146; G02B 13/18; G02B 17/004; G02B 17/008; G02B 17/0605; G02B 17/0621; G02B 23/02; G02B 23/06; G02B 27/0012; G02B 27/0025; G02B 27/0037; G02B 27/005; G02B 27/0056; G02B 27/0062; G02B 27/0068; G02B 27/0103; G02B 27/0116; G02B 27/0145; G02B 2027/0105–0109; G02B 2027/0174; G02B 2027/0198; G02B 27/4205; G02B 27/4211; G02B 27/4261–4277; G02B 27/4288; G02B 27/4294; G02B 27/44; G02B 27/62; G03H 1/08; G03H 1/0808; G03H 2001/0816; G03H 1/0841; G03H 2001/085; G03H 2222/14; G03H 2222/23; G03H 2222/24; G03H 2240/53; G03H 2250/42; G03H 2270/21
USPC ......... 359/1–35, 489.07, 558–576, 708, 719, 359/721, 722, 737, 738, 809, 846, 849, 359/850, 857, 858, 862, 863, 865
See application file for complete search history.

(56) References Cited

U.S. PATENT DOCUMENTS

| | | | |
|---|---|---|---|
| 3,897,136 A | 7/1975 | Bryngdahl | |
| 4,160,598 A | 7/1979 | Firester et al. | |
| 4,301,023 A | 11/1981 | Schuberth | |
| 4,698,816 A | 10/1987 | Chun | |
| 4,956,141 A | 9/1990 | Allen | |
| 4,983,332 A | 1/1991 | Hahn | |
| 5,016,265 A * | 5/1991 | Hoover | G21K 7/00 |
| | | | 378/145 |
| 5,032,009 A | 7/1991 | Gibbons | |
| 5,042,950 A | 8/1991 | Salmon, Jr. | |
| 5,047,847 A | 9/1991 | Toda | |
| 5,100,231 A | 3/1992 | Sasnett et al. | |
| 5,142,411 A | 8/1992 | Fiala | |
| 5,150,234 A | 9/1992 | Takahashi | |
| 5,218,610 A | 6/1993 | Dixon | |
| 5,321,539 A | 6/1994 | Hirabayashi | |
| 5,325,218 A | 6/1994 | Willett | |
| 5,446,596 A | 8/1995 | Mostrorocco | |
| 5,619,325 A | 4/1997 | Yoshida | |
| 5,621,525 A | 4/1997 | Vogeler et al. | |
| 5,712,721 A | 1/1998 | Large | |
| 5,895,422 A | 4/1999 | Hauber | |
| 5,903,330 A | 5/1999 | Funschilling | |
| 5,907,435 A * | 5/1999 | Ang | G02B 5/1876 |
| | | | 359/19 |
| 5,989,758 A | 11/1999 | Komatsu | |
| 6,091,471 A | 7/2000 | Kim et al. | |
| 6,107,617 A | 8/2000 | Love et al. | |
| 6,139,147 A | 10/2000 | Zhang | |
| 6,170,952 B1 | 1/2001 | La Haye et al. | |
| 6,191,880 B1 | 2/2001 | Schuster | |
| 6,219,185 B1 | 4/2001 | Hyde | |
| 6,320,663 B1 | 11/2001 | Ershov | |
| 6,373,549 B1 | 4/2002 | Tombling et al. | |
| 6,452,145 B1 | 9/2002 | Graves et al. | |
| 6,551,531 B1 | 4/2003 | Ford | |
| 6,678,042 B2 | 1/2004 | Tabirian et al. | |
| 6,728,049 B1 | 4/2004 | Tabirian et al. | |
| 6,792,028 B2 | 9/2004 | Cook | |
| 6,911,637 B1 | 6/2005 | Vorontsov et al. | |
| 7,048,619 B2 | 5/2006 | Park | |
| 7,094,304 B2 | 8/2006 | Nystrom | |
| 7,095,772 B1 | 8/2006 | Delfyett | |
| 7,196,758 B2 | 3/2007 | Crawford | |
| 7,319,566 B2 | 1/2008 | Prince | |
| 7,324,286 B1 | 1/2008 | Glebov | |
| 7,450,213 B2 | 11/2008 | Kim et al. | |
| 7,764,426 B2 | 7/2010 | Lipson | |
| 8,045,130 B2 | 10/2011 | Son | |
| 8,077,388 B2 | 12/2011 | Gerton | |
| 8,264,623 B2 | 9/2012 | Marrucci | |
| 8,520,170 B2 | 8/2013 | Escuti | |
| 8,582,094 B1 | 11/2013 | Shortt | |
| 8,643,822 B2 | 2/2014 | Tan et al. | |
| 8,937,701 B2 | 1/2015 | Rossini | |
| 8,982,313 B2 | 3/2015 | Escuti et al. | |
| 9,535,258 B1 * | 1/2017 | Whiteaker | G02B 27/4211 |
| 9,541,772 B2 | 1/2017 | Desio et al. | |
| 9,557,456 B2 | 1/2017 | Tabirian et al. | |
| 9,592,116 B2 | 3/2017 | De Sio et al. | |
| 9,617,205 B2 | 4/2017 | Tabirian et al. | |
| 9,658,512 B2 | 5/2017 | Tabirian et al. | |
| 9,715,048 B2 | 7/2017 | Tabirian et al. | |
| 9,753,193 B2 | 9/2017 | Tabirian et al. | |
| 9,976,911 B1 | 5/2018 | Tabirian et al. | |
| 9,983,479 B2 | 5/2018 | Tabirian et al. | |
| 10,031,424 B2 | 7/2018 | Tabirian et al. | |
| 10,036,886 B2 | 7/2018 | Tabirian et al. | |
| 10,075,625 B2 | 9/2018 | Tabirian et al. | |
| 10,107,945 B2 | 10/2018 | Tabirian et al. | |
| 10,114,239 B2 | 10/2018 | Tabirian et al. | |
| 10,120,112 B2 | 11/2018 | Tabirian et al. | |
| 10,185,182 B2 | 1/2019 | Tabirian et al. | |
| 10,191,191 B2 | 1/2019 | Tabirian et al. | |
| 10,191,296 B1 | 1/2019 | Tabirian et al. | |
| 10,197,715 B1 | 2/2019 | Tabirian et al. | |
| 10,274,650 B2 | 4/2019 | Tabirian et al. | |
| 10,274,805 B2 | 4/2019 | Tabirian et al. | |
| 2001/0002895 A1 | 6/2001 | Kawano | |
| 2001/0018612 A1 | 8/2001 | Carson | |
| 2001/0030720 A1 | 10/2001 | Ichihashi | |
| 2002/0027624 A1 | 3/2002 | Seiberle | |
| 2002/0097361 A1 | 7/2002 | Ham | |
| 2002/0167639 A1 | 11/2002 | Coates | |
| 2003/0021526 A1 | 1/2003 | Bouevitch | |
| 2003/0072896 A1 | 4/2003 | Kwok | |
| 2003/0137620 A1 | 7/2003 | Wang et al. | |
| 2003/0152712 A1 | 8/2003 | Motomura | |
| 2003/0206288 A1 | 11/2003 | Tabirian et al. | |
| 2003/0214700 A1 | 11/2003 | Sidorin | |
| 2003/0218801 A1 | 11/2003 | Korniski et al. | |
| 2004/0051846 A1 | 3/2004 | Blum et al. | |
| 2004/0081392 A1 | 4/2004 | Li | |
| 2004/0105059 A1 | 6/2004 | Ohyama | |
| 2004/0165126 A1 | 8/2004 | Ooi et al. | |
| 2005/0030457 A1 | 2/2005 | Kuan et al. | |
| 2005/0110942 A1 | 5/2005 | Ide | |
| 2005/0219696 A1 | 10/2005 | Albert et al. | |
| 2005/0271325 A1 | 12/2005 | Anderson et al. | |

(56) References Cited

U.S. PATENT DOCUMENTS

| | | |
|---|---|---|
| 2005/0276537 A1 | 12/2005 | Frisken |
| 2005/0280717 A1 | 12/2005 | Chen |
| 2006/0008649 A1 | 1/2006 | Shinichiro |
| 2006/0055883 A1 | 3/2006 | Morris |
| 2006/0109532 A1 | 5/2006 | Savas |
| 2006/0221449 A1 | 10/2006 | Glebov |
| 2006/0222783 A1 | 10/2006 | Hayashi |
| 2007/0032866 A1 | 2/2007 | Portney |
| 2007/0040469 A1 | 2/2007 | Yacoubian |
| 2007/0115551 A1 | 5/2007 | Spilman |
| 2007/0122573 A1 | 5/2007 | Yasuike |
| 2007/0132930 A1 | 6/2007 | Ryu et al. |
| 2007/0247586 A1 | 10/2007 | Tabirian |
| 2007/0258677 A1 | 11/2007 | Chigrinov |
| 2008/0226844 A1 | 9/2008 | Shemo |
| 2008/0278675 A1 | 11/2008 | Escuti |
| 2009/0002588 A1 | 1/2009 | Lee et al. |
| 2009/0052838 A1 | 2/2009 | McDowall et al. |
| 2009/0073331 A1 | 3/2009 | Shi |
| 2009/0122402 A1 | 5/2009 | Shemo |
| 2009/0141216 A1 | 6/2009 | Marrucci |
| 2009/0201572 A1 | 8/2009 | Yonak |
| 2009/0256977 A1 | 10/2009 | Haddock |
| 2009/0257106 A1 | 10/2009 | Tan |
| 2009/0264707 A1 | 10/2009 | Hendricks |
| 2010/0003605 A1 | 1/2010 | Gil |
| 2010/0066929 A1 | 3/2010 | Shemo |
| 2011/0069377 A1 | 3/2011 | Wu et al. |
| 2011/0075073 A1 | 3/2011 | Oiwa |
| 2011/0085117 A1 | 4/2011 | Moon et al. |
| 2011/0097557 A1 | 4/2011 | May |
| 2011/0109874 A1 | 5/2011 | Piers |
| 2011/0135850 A1 | 6/2011 | Saha |
| 2011/0188120 A1 | 8/2011 | Tabirian |
| 2011/0234944 A1 | 9/2011 | Powers |
| 2011/0262844 A1 | 10/2011 | Tabirian |
| 2012/0075168 A1 | 3/2012 | Osterhout et al. |
| 2012/0140167 A1 | 6/2012 | Blum |
| 2012/0162433 A1 | 6/2012 | Fuentes Gonzalez |
| 2012/0188467 A1 | 7/2012 | Escuti |
| 2013/0057814 A1 | 3/2013 | Prushinskiy et al. |
| 2013/0202246 A1 | 8/2013 | Meade |
| 2014/0055740 A1 | 2/2014 | Spaulding |
| 2014/0211145 A1 | 7/2014 | Tabirian |
| 2014/0252666 A1 | 9/2014 | Tabirian |
| 2015/0049487 A1 | 2/2015 | Connor |
| 2015/0081016 A1 | 3/2015 | De Sio et al. |
| 2015/0276997 A1 | 10/2015 | Tabirian et al. |
| 2016/0011564 A1 | 1/2016 | Tanabe et al. |
| 2016/0023993 A1 | 1/2016 | Tabirian |
| 2016/0047955 A1 | 2/2016 | Tabirian |
| 2016/0047956 A1 | 2/2016 | Tabirian |
| 2016/0209560 A1 | 7/2016 | Tabirian et al. |
| 2016/0231592 A9 | 8/2016 | Beaton et al. |
| 2016/0270656 A1* | 9/2016 | Samec ................... A61B 3/085 |
| 2016/0363484 A1 | 12/2016 | Barak et al. |
| 2017/0010397 A1 | 1/2017 | Tabirian et al. |

FOREIGN PATENT DOCUMENTS

| | | |
|---|---|---|
| GB | 2209751 | 5/1989 |
| JP | 2001142033 | 5/2001 |
| JP | 2004226752 | 8/2004 |
| WO | 2007122573 | 11/2007 |
| WO | 2008130555 | 10/2008 |
| WO | 2008130559 | 10/2008 |

OTHER PUBLICATIONS

Martinez-Cuenca, et al., Reconfigurable Shack-Hartmann Sensor Without Moving Elements,Optical Society of America, vol. 35, No. 9, May 2010, 3 pages.

Serak, S., et al., High-efficiency 1.5 mm Thick Optical Axis Grating and its Use for Laser Beam Combining, Optical Society of America, vol. 32, No., Jan. 2007, 4 pages.

Ono et al., Effects of phase shift between two photoalignment substances on diffration properties in liquid crystalline grating cells, Appl. Opt. vol. 48, Jan. 2009, 7 pgs.

Naydenova et al., "Diffraction form polarization holographic gratings with surface relief in side chain azobenzene polyesters" J. Opt. Soc. Am. B, vol. 15, (1998), 14 pages.

Oh et al., Achromatic polarization gratings as highly efficent thin-film polarizing beamsplitters for broadband light Proc. SPIE vol. 6682, (2008), 4 pages.

Nersisyan, S., et al., Polarization insensitive imaging through polarization gratins, Optics Express, vol. 17, No. 3, Feb. 2, 2009, 14 pages.

OISE, Optics in the Southeast, Technical Conference and Tabletop Exhibit, Optical Society of America, Orlando, FL., Nov. 12-13, 2003, 9 pages.

Dierking, Polymer Network-Stabilized Liquid Crystals, Advanced Materials, vol. 12, No. 3, 2000, 15 pages.

Andersen, G., et al., Broadband Antihole Photon Sieve Telescope, Applied Optics, Jun. 2007, pp. 3706-3708, vol. 46, No. 18.

Early, J. et al., Twenty Meter Space Telescope Based on Diffractive Fresnel Lens, SPIE, U.S. Department of Energy, Lawrence Livermore National Laboratory, Jun. 2003, 11 pages.

Beam Engineering for Advanced Measurements Co., et al., PCT Application No. PCT/US2016/038666 filed Jun. 22, 2016, Notification of Transmittal of the International Search Report and the Written Opinion of the International Searching Authority, or the Declaration, dated Oct. 10, 2016, 16 pages.

Tabiryan, et al., Broadband waveplate lenses, Optics Express 7091, vol. 24, No. 7, Mar. 24, 2016, 12 pages.

Tabiryan, et al. Thin waveplate lenses of switchable focal length—new generation in optics, Optics Express 25783, vol. 23, No. 20, Sep. 19, 2015, 12 pages.

Tabiryan, et al. Superlens in the skies: liquid-crystal-polymer technology for telescopes, Newsroom, 2016, 2 pages.

Nersisyan, et al., The principles of laser beam control with polarization gratings introduced as diffractive waveplates, Proc. of SPIE, vol. 7775, 2010, 10 pages.

Heller, A Giant Leap for Space Telescopes, Foldable Optics, S&TR, Mar. 2003, 7 pages.

Beam Engineering for Advanced Measurements Co., PCT Application No. PCT/US2015026186, The Extended European Search Report, filed on Mar. 8, 2017, 13 pages.

Blinov, et al., Electrooptic Effects in Liquid Crystal MAterials, Springer-Verlag New York, 1994, 17 pages.

Crawford, et al., Liquid Crystals in Complex Geometries; Formed by Polymer and Porous Networks, Taylor and Francis, 1996, 4 pages.

Honma, et al., Liquid-Crystal Fresnel Zone Plate Fabricated by Microrubbing, Japanese Journal of Applied Phsyics, vol. 44, No. 1A, 2005, 4 pages.

Tabirian, N., et al, U.S. Appl. No. 61/757,259, filed Jan. 28, 2013, 29 pages.

Sobolewska et al., "On the inscription of period and half period surface relief gratings in azobenzene-functionalized polymers", J. Phys. Chem., vol. 112 (15) Jan. 3, 2008, 10 pages.

Barrett et al., Model of laser driven mass transport in thin films of dye-functionalized polymers, J. Chem. Phys., vol. 109 (4), Jul. 22, 1998, 13 pages.

Tabirian, U.S. Appl. No. 14/214,375, filed Mar. 14, 2014, Office Action Summary dated Jun. 27, 2017, 10 pages.

Tabirian, et al., U.S. Appl. No. 14/688,425, filed Apr. 16, 2015, Office Action Summary dated Oct. 5, 2017, 10 pages.

Serak, et al. Diffractive Waveplate Arrays [Invited], Journal of the Optical Society of America B, May 2017, pp. B56-B63, vol. 34, No. 5, 8 pages.

Emoto, Optical and Physical Applications of Photocontrollable Materials: Azobenzene-Containing and Liquid Crystalline Polymers, Polymers,Jan. 2012, 150-186, vol. 4, 38 pages.

Pepper, M. et al, Nonlinear Optical Phase Conjugation, IEEE, Sep. 1991, pp. 21-34, 14 pages.

(56) References Cited

OTHER PUBLICATIONS

Tabirian, N., Utility U.S. Appl. No. 14/194,808, filed Mar. 2, 2014, Office Action Summary dated Feb. 9, 2018, 10 pages.
Tabirian, N., Utility U.S. Appl. No. 14/324,126, filed Jul. 4, 2014, Office Action Summary dated Feb. 8, 2018, 13 pages.
De Sio, L., et al., "Digital Polarization Holography Advancing Geometrical Phase Optics," 2016, Optics Express, vol. 24, Issue 16, pp. 18297-18306, 10 pages.
Borek, G. and D. Brown, "High-performance diffractive optics for beam shaping," 1999, Proceeding of SPIE, vol. 3633, pp. 51-60, 10 pages.
Gerchberg, et al, practical algorithm for the determination of the phase from image and diffraction plane pictures, 1972, Optik, vol. 35, Issue 2, pp. 237-246, 10 pages.
Tabirian, N., Utility U.S. Appl. No. 15/189,551, filed Jun. 22, 2016, Office Action Summary dated Feb. 27, 2018, 16 pages.
Tabiryan, et al., The Promise of Diffractive Waveplates, OPN Optics and Photonics News, Mar. 2010, 6 pages.
Tabiryan, et al., Fabricating Vector Vortex Waveplates for Coronagraphy, 2012, 12 pages.
Tabirian, et al., PCT Application No. PCT/US15/26186 filed Apr. 16, 2015, Notification of Transmittal of the International Search Report and the Written Opinion of the International Searching Authority dated Jul. 14, 2015, 17 pages.
Nersisyan, et al., Study of azo dye surface command photoalignment material for photonics applications, Applied Optics, vol. 49, No. 10, Apr. 1, 2010, 8 pages.
Nersisyan, et al., Characterization of optically imprinted polarization gratings, Applied Optics, vol. 48, No. 21, Jul. 20, 2009, 6 pages.
Nersisyan, et al., Fabrication of Liquid Crystal Polymer Axial Waveplates for UV-IR Wavelengths, Optics Express, vol. 17, No. 14, Jul. 2009, 9 pages.
Nersisyan, et al., Optical Axis Gratings in Liquid Crystals and Their Use for Polarization Insensitive Optical Switching, Journal of Nonlinear Optical Physics & Materials, vol. 18, No. 1, Mar. 2009, 47 pages.
Nersisyan, et al., Polarization insensitive imaging through polarization gratings, Optics Express, vol. 17, No. 3, Feb. 2, 2009, 14 pages.
Sarkissian, et al., Longitudinally modulated nematic bandgap structure, Optical Society of America, vol. 23, No. 8, Aug. 2008, 6 pages.
Sarkissian, et al., Polarization-universal bandgap in periodically twisted nematics, Optics Letters, vol. 31, No. 11, Jun. 1, 2006, abstract, 4 pages.
Sarkissian, et al., Periodically Aligned Liquid Crystal: Potential Application for Projection Displays, Mol. Cryst. Liq. Cryst., vol. 451, 2006, 19 pages.
Sarkissian, et al., Potential application of Periodically Aligned Liquid Crystal cell for projection displays, JThE12, 2005, 3 pages.
Sarkissian, et al., Polarization-Controlled Switching Between Diffraction Orders in Transverse-Periodically Aligned Nematic Liquid Crystals, Optics Letters, Aug. 2006, abstract, 4 pages.
Schadt, et al., Photo-Induced Alignment and Patterning of Hybrid Liquid Crystalline Polymer Films on Single Substrates, Jpn. J. Appl. Phys., vol. 34, Part 2, No. 6B, Jun. 15, 1995, 4 pages.
Schadt, et al., Photo-Generation of Linearly Polymerized Liquid Crystal Aligning Layers Comprising Novel, Integrated Optically Patterned Retarders and Color Filters, Jpn. J. Appl. Phys., vol. 34, Part 1, No. 6A, Jun. 1995, 10 pages.
Schadt, et al., Optical patterning of multi-domain liquid-crystal displays with wide viewing angles, Nature, vol. 381, May 16, 1996, 4 pages.
Escuti, et al., A Polarization-Independent Liquid Crystal Saptial-Light-Modulator, Liquid Crystals X, Proc. of SPIE, vol. 6332, 2006, 9 pages.
Escuti, et al., Polarization-Independent LC Microdisplays Using Liquid Crystal Polarization Gratings: A Viable Solution (?), Dept of Electrical & Computer Engineering @ ILCC, Jul. 1, 2008, 30 pages.
Escuti, et al., Simplified Spectropolarimetry Using Reactive Mesogen Polarization Gratings, Imaging Spectrometry XI, Proc. of SPIE, vol. 6302, 2006, 11 pages.
Gibbons, et al., Surface-mediated alignment of nematic liquid crystals with polarized laser light, Nature, vol. 351, May 2, 1991, 1 page.
Gibbons, et al., Optically Controlled Alignment of Liquid Crystals: Devices and Applications, Molecular Crystals and Liquid Crystals, vol. 251, 1994, 19 pages.
Gibbons, et al., Optically generated liquid crystal gratings, Appl. Phys. Lett., 65, Nov. 14, 1994, 3 pages.
University of Central Florida, School of Optics CREOL PPCE, Optics in the Southeast, Technical Conference and Tabletop Exhibit, Nov. 12-13, 2003, 9 pages.
Ichimura, et al., Surface assisted photoalignment control of lyotropic liquid crystals, Part 1, Characterization and photoalignment of aqueous solutions of a water soluble dyes as lyotropic liquid crystals, J. Materials. Chem., vol. 12, Oct. 2002, abstract, 2 pages.
Ichimura, et al., Reversible Change in Alignment Mode of Nematic Liquid Crystals Regulated Photochemically by "Command Surfaces" Modified with an Azobenzene Monolayer, American Chemical Society, Langmuir, vol. 4, No. 5, Feb. 1988, 3 pages.
Zel'Dovich, et al., Devices for displaying visual information, Disclosure, School of Optics/CREOL, University of Central Florida, Jul. 2000, 10 pages.
Provenzano, et al., Highly efficient liquid crystal based diffraction grating induced by polarization holograms at the aligning surfaces, Applied Physics Letter 89, Sep. 2006, 4 pages.
Titus, et al., Efficient polarization-independent, re ective liquid crystal phase grating, Applied Physics Letter 71, Oct. 20, 1997, 3 pages.
Chen, et al. An Electrooptically Controlled Liquid-Crystal Diffraction Grating, Applied Physics Letter 67, Oct. 30, 1995, 4 pages.
Kim, et al., Unusual Characteristics of Diffraction Gratings in a Liquid Crystal Cell, Advanced Materials, vol. 14, No. 13-14, Jul. 4, 2002, 7 pages.
Pan, et al., Surface Topography and Alignment Effects in UV-Modified Polyimide Films with Micron Size Patterns, Chinese Journal of Physics, vol. 41, No. 2, Apr. 2003, 8 pages.
Fuh, et al., Dynamic studies of holographic gratings in dye-doped liquid-crystal films, Optics Letter, vol. 26, No. 22, Nov. 15, 2001, 3 pages.
Yu, et al., Polarization Grating of Photoaligned Liquid Crystals with Oppositely Twisted Domain Structures, Molecular Crystals Liquid Crystals, vol. 433, 2005, 7 pages.
Crawford, et al., Liquid-crystal diffraction gratings using polarization holography alignment techniques, Journal of Applied Physics 98, Dec. 2005, 10 pages.
Seiberle, et al., 38.1 Invited Paper: Photo-Aligned Anisotropic Optical Thin Films, SID 03 Digest, 2003, 4 pages.
Wen, et al., Nematic liquid-crystal polarization gratings by modification of surface alignment, Applied Optics, vol. 41, No. 7, Mar. 1, 2002, 5 pages.
Anagnostis, et al., Replication produces holographic optics in volume, Laser Focus World, vol. 36, Issue 3, Mar. 1, 2000, 6 pages.
Gale, Replicated Diffractive Optics and Micro-Optics, Optics and Photonics News, Aug. 2003, 6 pages.
McEldowney, et al., Creating vortex retarders using photoaligned LC polymers, Optics Letter, vol. 33, No. 2, Jan. 15, 2008, 3 pages.
Marrucci, et al., Pancharatnam-Berry phase optical elements for wave front shaping in the visible domain, Appl. Phys. Lett. 88, May 2006, 3 pages.
Stalder, et al., Lineraly polarized light with axial symmetry generated by liquid-crystal polarization converters, Optics Letters vol. 21, No., Dec. 1996, 3 pages.
Kakichashvili, et al., Method for phase polarization recording of holograms, Soy. J. Quantum. Electron, vol. 4, No. 6, Dec. 1974, 5 pages.
Todorov, et al., High-Sensitivity Material With Reversible Photo-Induced Anisotropy, Optics Communications, vol. 47, No. 2, Aug. 15, 1983, 4 pages.
Attia, et al., Anisoptropic Gratings Recorded From Two Circularly Polarized Coherent Waves, Optics Communications, vol. 47, No. 2, Aug. 15, 1983, 6 pages.

(56) References Cited

OTHER PUBLICATIONS

Cipparrone, et al., Permanent polarization gratings in photosensitive langmuir blodget films, Applied Physics Letter, vol. 77, No. 14, Oct. 2, 2000, 4 pages.
Nikolova, et al., Diffraction Efficiency and Selectivity of Polarization Holographic Recording, Optica Acta: International Journal of Optics, vol. 31, No. 5, Jan. 1984, 11 pages.
Lee et al., "Generation of pretilt angles of liquid crystals on cinnamte-based photoalignment . . . ", Opt., Expr., vol. 17 Dec. 26, 2009, abstract, 4 pages.
Yaroshchuk et al. "Azodyes as photoalignment agents for polymerizable liquid crystals", IDW'06 Digest vol. 1-3, 2006, 4 pages.
Chigrinov et al. "Anchoring properties of photoaligned azo-dye materials" Phys. Rev., E vol. 68, Dec. 2003, 5 pages.
Pagliusi et al. Surface-induced photorefractivity in twistable nematics: toward the all-optical control of gain, Opt. Expr. vol. 16, Oct. 2008, 9 pages.

\* cited by examiner

BROADBAND IMAGING WITH DIFFRACTIVE WAVEPLATE COATED MIRRORS AND DIFFRACTIVE WAVEPLATE OBJECTIVE LENS

CROSS REFERENCE TO RELATED APPLICATIONS

This application claims the benefit of priority to U.S. Provisional Patent Application Ser. No. 62/246,923 filed Oct. 27, 2015. The entire disclosure of the application listed in this paragraph is incorporated herein by specific reference thereto.

GOVERNMENT LICENSE RIGHTS

This invention was made with Government support under NASA Space Technology Mission Directorate contract number NNX15AL92G, awarded by NASA (National Aeronautics and Space Administration). The government has certain rights in this invention.

FIELD OF INVENTION

This invention relates to imaging systems and, in particular, to diffractive waveplate lenses, mirrors, devices, systems and methods for performing imaging over a broad spectral band.

BACKGROUND AND PRIOR ART

Imaging systems are ubiquitous in the modern world, primarily due to progressive improvements in digital imaging technology, allowing high quality at low cost. The cost of image sensors has been reduced drastically over the past few decades, enabling very high quality sensors in even such relatively inexpensive consumer products as smart phones.

Although there has been great progress in reducing the cost of image sensors, especially for use in the visible band of the electromagnetic spectrum (i.e. the band over which human vision functions), the progress in reducing the weight and cost of the optical components that form the image on the image sensor has been less impressive. In many imaging systems, both cost and weight are dominated by the optics, with the image sensor and associated electronics contributing a relatively small fraction of the overall system cost.

In many imaging systems, the portion of the optics that dominates the cost of the optics, and may even dominate the overall cost of the system, is the first optic with optical power encountered by electromagnetic radiation incident on the system. Here an optic having "power" is one that causes convergence of an incident beam. If this first optic is a refractive lens, it is generally referred to as the objective lens. If this first optic is a curved reflective mirror, it generally referred to as the primary mirror.

One of the factors that drives the cost of objective lenses and primary mirrors in optical systems is the fact that these optics have curved surfaces whose shape must comply with dimensional tolerances that are difficult to achieve.

Recently, it has become possible to employ a flat diffractive waveplate lens comprised of ultra-thin diffractive waveplate coatings on a thin, flat substrate, as the first optical element in some imaging systems, thus eliminating the need for a curved objective lens or curved primary mirror. See U.S. Non-Provisional patent application Ser. No. 15/189,551 filed Jun. 22, 2016, which claims the benefit of priority to U.S. Provisional Patent Application Ser. No. 62/182,975 filed Jun. 22, 2015, which are both incorporated by reference in their entirety.

This replacement has the potential to allow large cost and weight reductions for some applications. A critical advantage of using diffractive waveplate lenses is that they possess continuous structure that can be formed as micrometer thin film coatings on flat or curved shapes. Additionally, as opposed to other diffractive lenses such as Fresnel lenses, diffractive waveplate lenses are capable of near 100% diffraction efficiency in a broad band of wavelengths.

A fundamental property of diffractive waveplate lenses, as well as other types of diffractive elements, is that the angle through which electromagnetic radiation is deflected by such elements is highly dependent on the wavelength. In imaging systems, this produces chromatic aberrations, which can degrade the image quality.

For some applications, it has been shown that chromatic aberrations can be suppressed by means of a single corrector mirror. However, although the correction that is known to be possible with a single corrector mirror is sufficient for some applications such as laser communications, for which the optical signals are contained in a narrow spectral band, in other applications the degree of chromatic aberration correction is not sufficient.

In order to obtain the noted benefits of using a diffractive waveplate lens as the objective lens of an imaging system, it is necessary to identify a technique for reducing the chromatic aberrations of the diffractive waveplate lens used as the objective lens of an imaging system.

Thus, there is a need for a method and apparatus for further reducing the chromatic aberrations of diffractive waveplate lenses to an extent beyond the reduction achievable using prior art.

SUMMARY OF THE INVENTION

A primary objective of the present invention is to provide diffractive waveplate lenses, mirrors, devices, systems and methods for performing imaging over a broad spectral band, with significantly reduced cost, size, and weight of the optical system.

A secondary objective of the present invention is to provide diffractive waveplate lenses, mirrors, devices, systems and methods for reducing the chromatic aberrations of the diffractive waveplate lens used as the objective lens of an imaging system.

An imaging system can include a diffractive waveplate objective lens for focusing input light, a set of diffractive waveplate coated mirrors, and an imaging sensor, wherein the diffractive waveplate objective lens and the set of diffractive corrector mirrors are configured such that all rays of light within an operating wavelength band incident on the diffractive waveplate objective lens are brought to the same system focal plane on the imaging sensor.

Both said diffractive waveplate objective lens and said diffractive waveplate coated mirrors can operate in a broad band of spectrum selected from at least one of: ultraviolet, visible, near infrared, short wave infrared, mid-wave infrared, and long-wave infrared wavelengths.

Both said diffractive waveplate objective lens and said diffractive waveplate coated mirrors can operate in multiple spectral bands selected from at least one of: ultraviolet, visible, near infrared, short wave infrared, mid-wave infrared, and long-wave infrared wavelengths.

In the imaging system, chromatic aberrations can be reduced by a set of two diffractive waveplate coated mirrors employing a first diffractive waveplate coated mirror to bring all rays of light within an operating wavelength band incident on the diffractive waveplate objective lens to a second diffractive waveplate coated mirror; and wherein the second diffractive waveplate coated mirror brings all said rays of light to the same system focal plane.

The diffractive waveplate coated mirrors can include (a) a substrate with a reflective surface, (b) a phase retardation layer conforming to the reflective surface, and (c) a diffractive waveplate coating layer conforming to said reflective surface.

The phase retardation layer can be a quarter-wave plate.

The imaging system can further include a mechanical structure for holding and aligning said diffractive waveplate lens and said diffractive waveplate coated mirrors.

The imaging sensor can be a camera for collecting imaging data of an object within a spectral band selected from at least one of: ultraviolet, visible, near infrared, short wave infrared, mid-wave infrared, and long-wave infrared wavelengths.

The imaging system can include an electronic device for displaying an output of the imaging sensor.

The imaging sensor can be replaced by an eyepiece.

A method for fabricating an imaging system with diffractive waveplate coated mirrors correcting chromatic aberrations of a diffractive waveplate objective lens in an imaging system, can include the steps of selecting a diameter and focal length of the diffractive waveplate objective lens, selecting axial apex spacings and the diameters of the diffractive waveplate coated mirrors so that there is no vignetting for either of the diffractive waveplate coated mirrors for the entire operating wavelength range, selecting polynomial expansion coefficients for both curvature and phase profile of a first diffractive waveplate coatings of a first diffractive waveplate coated mirror so that an objective diffractive waveplate lens is imaged onto a surface of a second diffractive waveplate coated mirror at all wavelengths within the operating bandwidth of the imaging system for paraxial rays, setting polynomial expansion coefficients for both curvature and phase profile of a second diffractive waveplate coating of a second diffractive waveplate coated mirror, by having the imaging system focal point be at a selected distance from an apex of the second mirror, and that all wavelengths within the operating band converge to the system focal point for paraxial rays, and adjusting the polynomial expansion coefficients for the curvatures and phase profiles of the first and second diffractive waveplate coated mirrors in order to bring all rays incident over an entire clear aperture of the objective lens to the same imaging system focal point.

The imaging system can be a telescope. The imaging system can be augmented reality glasses. The imaging system can be a binocular.

An imaging system, can include a light source, a beam shaping system for forming an illuminated area, a diffractive waveplate objective lens for focusing the light collected from said illuminated area, a set of diffractive waveplate coated mirrors, and an imaging sensor, wherein the diffractive waveplate objective lens and the set of diffractive waveplate coated mirrors are configured so that all rays of light within an operating wavelength band incident on the diffractive waveplate objective lens are brought to the same system focal point on the imaging sensor.

The light source can emit radiation at wavelengths within a spectral band selected from at least one of ultraviolet, visible, near infrared, short wave infrared, mid-wave infrared and long-wave infrared wavelengths.

The light source can be a laser, which emits radiation at wavelengths within the spectral band of the imaging sensor, selected from at least one of ultraviolet, visible, near infrared, short wave infrared, mid-wave infrared, and long-wave infrared wavelengths.

The beam shaping system can include diffractive waveplate optics.

The diffractive waveplate optics can be electrically switched between states with and without optical power producing variable beam divergence or variable beam profile.

The imaging sensor can include a camera for collecting imaging data of the object within a spectral band selected from at least one of ultraviolet, visible, near infrared, short wave infrared, mid-wave infrared, and long-wave infrared wavelengths, wherein the camera captures imaging data when signals emitted by the laser light source of and reflected by the imaged object or scene are collected by said camera.

Further objectives and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The present invention relates to imaging systems employing a diffractive waveplate lens as the objective lens of the system, and employing two diffractive waveplate coated mirrors to bring radiation over a wide range of wavelengths to the same focal point.

Figure 1:
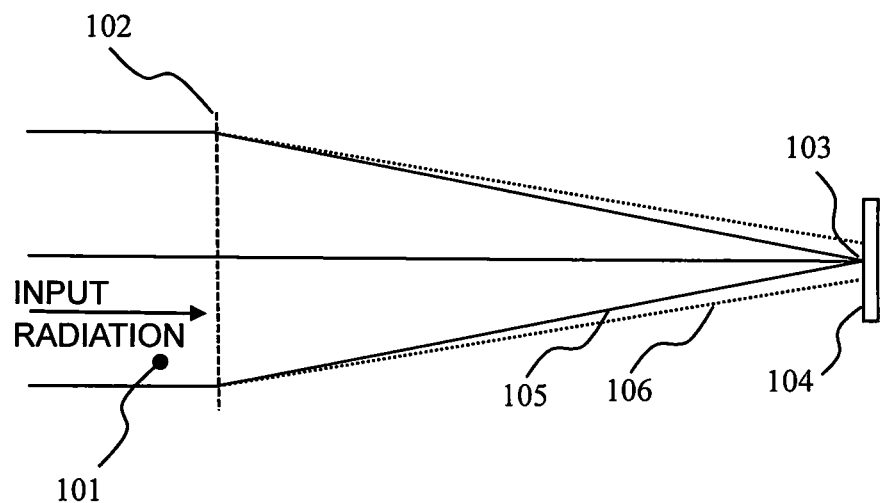
FIG. 1 illustrates an imaging system employing a single diffractive waveplate lens to image an object at a great distance from the imaging system.

A list of components will now be provided.
101 input electromagnetic radiation
102 diffractive waveplate lens
103 focal point
104 photodetector or photodetector array
105 radiation at a first wavelength
106 radiation at a wavelength shorter than the first wavelength
201 input electromagnetic radiation
202 diffractive waveplate objective lens
203 diffractive waveplate coated mirror
204 focal point
205 photodetector or photodetector array
206 radiation at a first wavelength
207 radiation at a wavelength shorter than the first wavelength
300 imaging system
301 incident electromagnetic radiation
302 diffractive waveplate objective lens
303 first diffractive waveplate coated mirror
304 second diffractive waveplate coated mirror
305 system focal point
306 photodetector or photodetector array
307 radiation at a first wavelength
308 intermediate focal point for radiation at a first wavelength
309 radiation at a wavelength shorter than the first wavelength
310 intermediate focal point for radiation at a wavelength shorter than the first wavelength
311 electronic processing and display
401 incident electromagnetic radiation
402 diffractive waveplate objective lens
403 first diffractive waveplate coated mirror
404 intermediate focal points for radiation over a range of wavelengths
405 second diffractive waveplate coated mirror
406 system focal point
1000 diffractive waveplate coated mirror
1020 substrate of mirror
1021 shaped mirror surface with a reflective coating
1022 phase retardation film
1023 diffractive waveplate coating
1101 light source
1105 light emitted by the light source
1110 beam shaper
1120 illuminating beam
1130 illuminated target
1140 light scattered from target
1150 light collected by the imaging system
1160 imaging system FIG. 1 illustrates a single diffractive waveplate lens collecting input electromagnetic radiation emanating from a distant on-axis target. The input radiation 101 is incident on the diffractive waveplate lens 102, and the effect of the diffractive waveplate lens on the input radiation is to bring the radiation at a selected wavelength to a focal point 103 on a photodetector or photodetector array 104. Radiation 105 at a first wavelength is brought to a sharp focal point 103, but radiation 106 at a shorter wavelength is not brought to the same focal point 103. This blurring of the focal point for radiation at all wavelengths except one limits the usefulness of the illustrated imaging system to a narrow spectral bandwidth.

Figure 2:
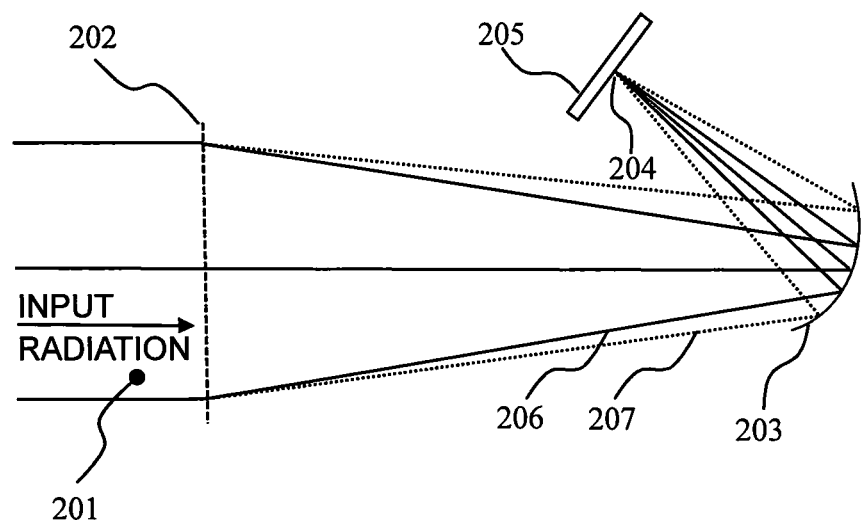
FIG. 2 illustrates an imaging system employing a diffractive waveplate lens as the objective lens of the imaging system, and including a single diffractive waveplate coated mirror to reduce chromatic aberrations.

FIG. 2 illustrates an optical design as described in U.S. Non-Provisional patent application Ser. No. 15/189,551 filed Jun. 22, 2016, which claims the benefit of priority to U.S. Provisional Patent Application Ser. No. 62/182,975 filed Jun. 22, 2015, entitled "Diffractive Mirrors and Diffractive Telescopes with Corrected Temporal Dispersion which are both incorporated by reference in their entirety In the optical design illustrated in FIG. 2, a diffractive waveplate lens is used for collecting the radiation from an input collimated beam, and a single diffractive waveplate coated mirror is used to correct for chromatic aberrations.

In FIG. 2, input radiation 201 is incident on a diffractive waveplate objective lens 202, which converges the radiation towards a focus. The converging radiation is collected by a diffractive waveplate coated mirror 203, which collects the radiation and directs it to a focal point 204 on a photodetector or photodetector array 205. Radiation 206 of a first wavelength and radiation 207 at a nearby shorter wavelength is all brought to the same focal point 204. However, although the range of wavelengths over which this correction technique can effectively collect and focus radiation is sufficient for some applications such as laser communications, it is insufficient for other applications such as some imaging applications.

Figure 3:
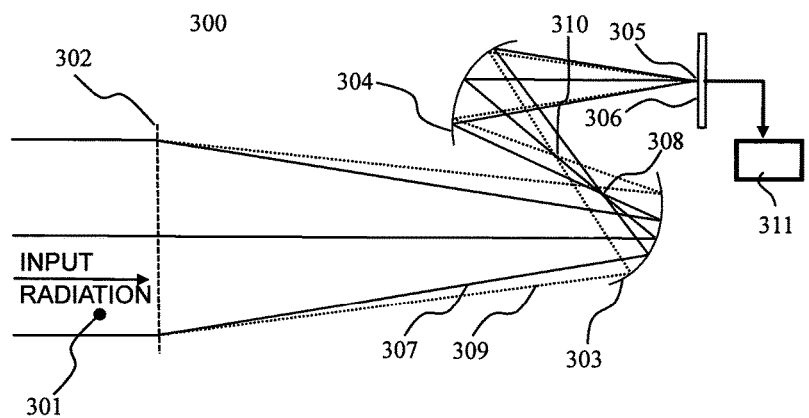
FIG. 3 illustrates an imaging system employing a diffractive waveplate lens as the objective lens of an imaging system, and two diffractive waveplate coated mirrors to reduce chromatic aberrations, with intermediate focal points between the two diffractive waveplate coated mirrors.

FIG. 3 illustrates a preferred embodiment of the present invention, in which two diffractive waveplate coated mirrors are used to bring all the radiation within a broad operating band of wavelengths to the same focal point. In FIG. 3, incident radiation 301 from a distant on-axis target is incident on a diffractive waveplate objective lens 302, which converges the radiation towards the focal point. A first diffractive waveplate coated mirror 303 collects the radiation and diffracts it towards a second diffractive waveplate coated mirror 304. The second diffractive waveplate coated mirror 304 focuses radiation within the operating band of the system to a system focal point 305 on a photodetector or photodetector array 306.

The diffractive waveplate objective lens 302, diffractive waveplate coated first mirror 303, and diffractive waveplate coated second mirror 304 are spaced and configured such that radiation 307 at the long wavelength limit of the operating wavelength band is brought to an intermediate focal point 308 between the two mirrors 303 and 304. In addition, the diffractive waveplate objective lens 302, diffractive waveplate coated first mirror 303, and diffractive waveplate coated second mirror 304 are spaced and configured such that radiation 309 at the short wavelength limit of the operating wavelength band is brought to an intermediate focal point 310 between the two mirrors 303 and 304. Finally, the entire system configuration is such that wavelengths over the broad operating wavelength band is all brought to the same system focal point 305. The imaging sensor, which may be a CCD camera, may be further connected to an electronic processing and display system 311.

Figure 4:
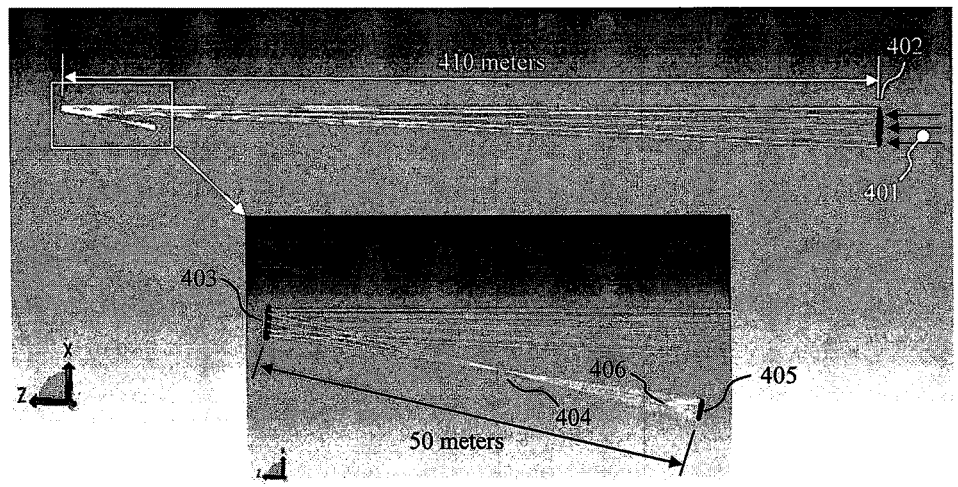
FIG. 4 illustrates a specific example of an imaging system employing a diffractive waveplate lens as the objective lens of an imaging system, and two diffractive waveplate coated mirrors to reduce chromatic aberrations.

An exemplary embodiment of the subject invention is illustrated and described in FIG. 4. The exemplary embodiment is that of a large-aperture astronomical telescope, but the design principles disclosed in describing the exemplary embodiment also apply to a wide variety of imaging systems, such as but not limited to surveillance imaging systems, augmented reality displays, virtual reality displays, communications including laser communications systems, and the like.

In FIG. 4, radiation 401 is incident on a diffractive waveplate objective lens 402, and is converged towards the first diffractive waveplate coated mirror 403. For the specific design used for illustration, the diameter of the objective lens 402 is 20 meters, and the distance from the diffractive waveplate objective lens 402 and the first diffractive waveplate coated mirror 403 is 410 meters. The first diffractive waveplate coated mirror 403 brings radiation of all wavelengths within the broad operating wavelength band of the system to focal points in the region 404 of FIG. 4. For this specific design used for illustration, the distance between the first diffractive waveplate coated mirror 403 and the second diffractive waveplate coated mirror 405 is 50 meters. The second diffractive waveplate coated mirror 405 brings radiation of all wavelengths within the broad operating wavelength band of the system to the same focal point 406, defined as the system focal point.

Figure 5:
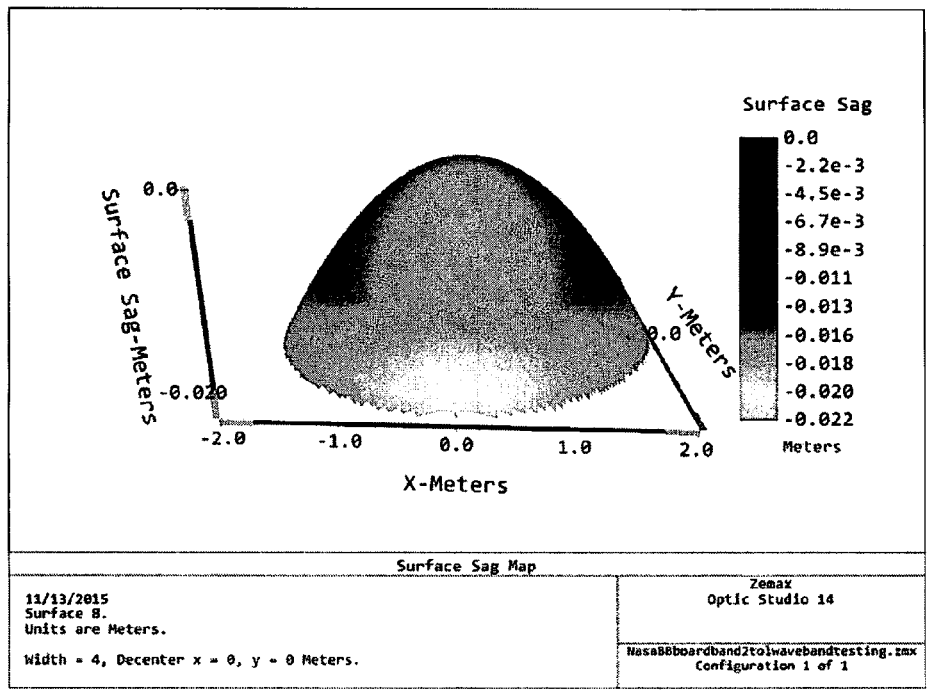
FIG. 5 illustrates the shape of the first diffractive waveplate coated mirror in the specific example presented in FIG. 4.

FIG. 5 illustrates the shape and size of the first diffractive waveplate coated mirror for the system described in FIG. 4. The diameter of this mirror is 4 meters, and the maximum sag distance from the center to the edge of the clear aperture is 22 millimeters. In this context, "sag distance" is the distance parallel to the axis of the mirror from a plane tangent to the apex of the mirror to the surface of the mirror.

Figure 6:
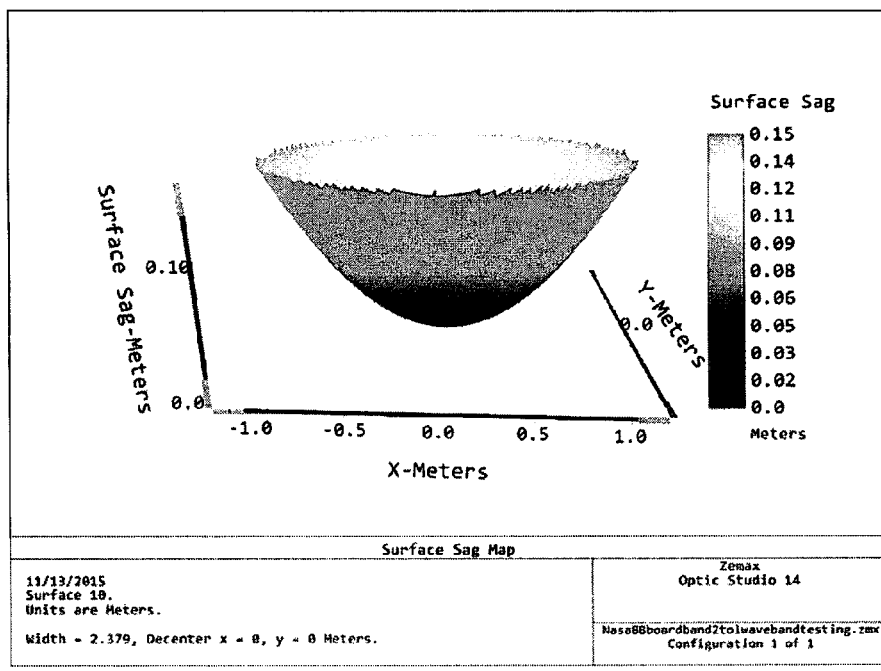
FIG. 6 illustrates the shape of the second diffractive waveplate coated mirror in the specific example presented in FIG. 4.

FIG. 6 illustrates the shape and size of the second diffractive waveplate coated mirror. The diameter of this mirror is 2.4 meters, and the maximum sag distance from the center to the edge of the clear aperture is 150 millimeters.

Figure 7:
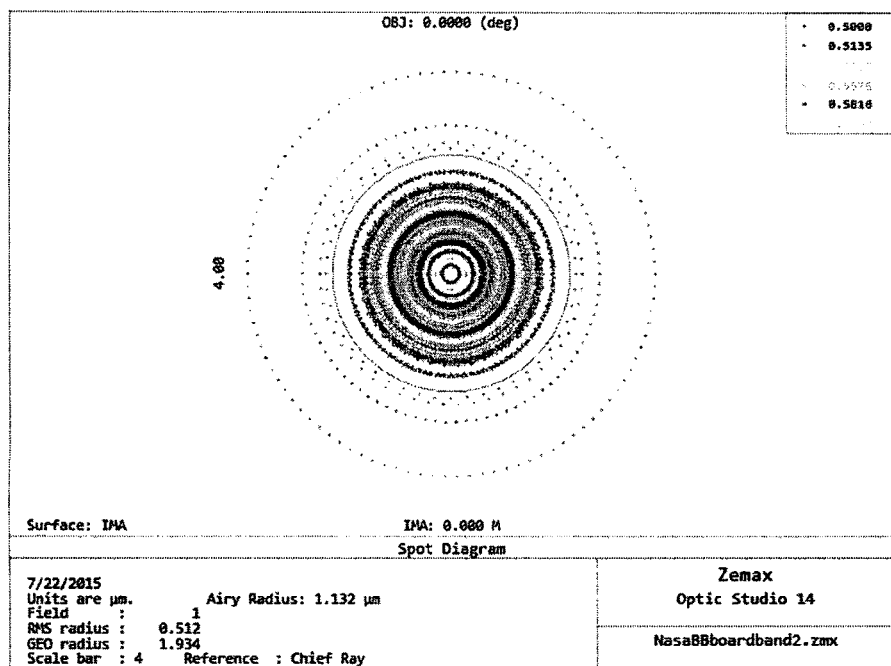
FIG. 7 illustrates the results of a polychromatic optical ray trace for the specific optical system design example presented in FIG. 4, demonstrating that the system is diffraction-limited over a significant portion of the visual spectral band.

FIG. 7 illustrates the result of tracing rays of optical radiation with wavelengths from 0.50 micrometers to 0.58 micrometers through the exemplary optical system illustrated in FIG. 4. For the on-axis case, the RMS radius of the rays at the focal plane is 0.5 micrometers, compared with the Airy radius of 1.1 micrometers. Since the system focal length is 34 m, this Airy radius corresponds in the object space to an RMS radius of 15 nanoradians and an Airy radius of 32 nanoradians. This predicted angular resolution is far superior to that of any existing telescope.

Figure 8:
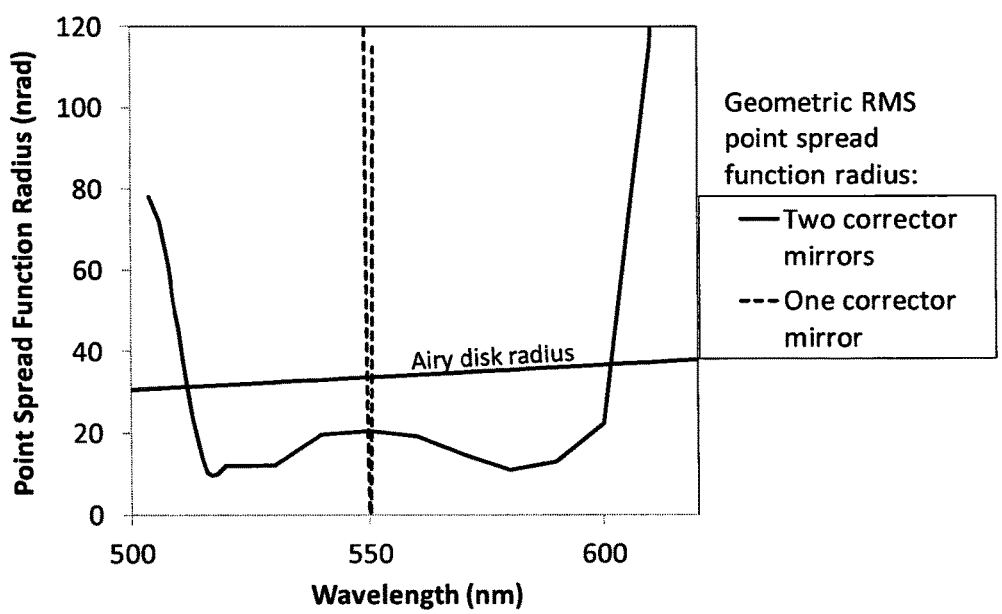
FIG. 8 illustrates the results of an optical ray trace for the specific example presented in FIG. 4, for several different wavelengths within the visual spectral band, demonstrating that the system is diffraction-limited over a significant portion of the visual spectral band.

The curve described in FIG. 8 as applying to the case of "Two corrector mirrors" illustrates the result of tracing rays of optical radiation with wavelengths from 500 nm to 650 nm through the exemplary optical system illustrated in FIG. 4. The design of the optical system, including the spacing between the elements, was held constant as the wavelength was varied for the calculations for which results are shown in FIG. 8. As is evident from FIG. 8, the system is diffraction limited for all wavelengths from 520 nm through 600 nm, since the geometric point spread function is smaller than the Airy disk radius for this range of wavelengths. For reference, an additional curve labeled "One corrector mirror" is shown in FIG. 8, illustrating the point spread function radius as a function of wavelength for a design employing only a single diffractive waveplate coated mirror, as is described in the previously referenced as described in U.S. Non-Provisional patent application Ser. No. 15/189,551 filed Jun. 22, 2016, which claims the benefit of priority to U.S. Provisional Patent Application Ser. No. 62/182,975 filed Jun. 22, 2015, entitled "Diffractive Mirrors and Diffractive Telescopes with Corrected Temporal Dispersion which are both incorporated by reference in their entirety FIG. 8 clearly demonstrates that the appropriate employment of a second diffractive waveplate coated mirror provides much broader diffraction-limited wavelength coverage than designs with only a single diffractive waveplate coated mirror.

Figure 9:
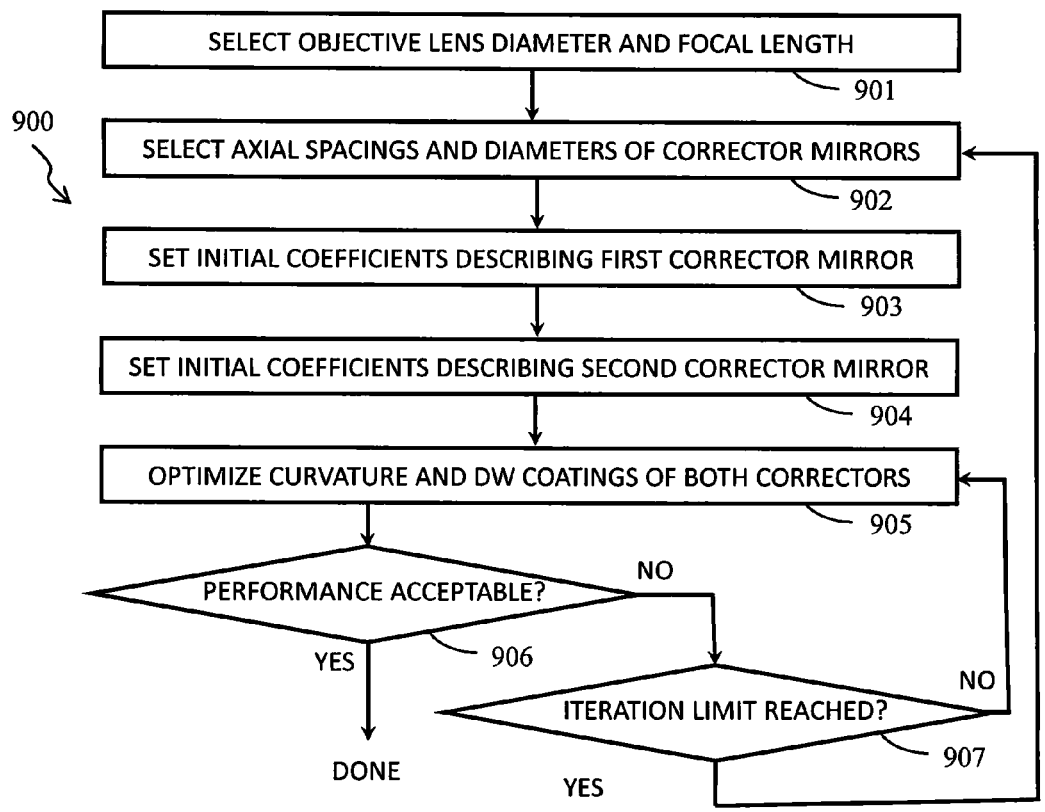
FIG. 9 illustrates the design process that was employed in producing the optical system design illustrated in FIG. 4.

The method 900 described in FIG. 9 can be used to create the exemplary optical system design illustrated in FIG. 4 through FIG. 8. The method described by FIG. 9 comprises steps 901 through 907. It is assumed that the operating wavelength band has already been selected prior to beginning the design. The expression "design wavelength" will be used here to mean the wavelength at the center of the operating wavelength band.

The first step 901 is to select the diameter and focal length of the objective lens, a diffractive waveplate lens, at a design wavelength. There are various considerations in this selection, such as the required angular resolution and light collecting power.

The second step 902 is to select the axial apex spacings and the diameters of the two diffractive waveplate coated mirrors. The diameter of the first diffractive waveplate coated mirror can be determined, as an example, by requiring that all rays from a distant on-axis target, for the entire operating wavelength range, that are within the diameter of the objective lens, be captured by the first diffractive waveplate coated mirror. The diameter of the second diffractive waveplate coated mirror can be determined, for example, by requiring that it capture the edge ray for the design wavelength, and for a distant on-axis target, assuming that the first diffractive waveplate coated mirror does not deviate any rays at the design wavelength.

The third step 903 is to select initial coefficients describing both the curvature and the diffractive waveplate coatings of the first diffractive waveplate coated mirror. This can be done by requiring that the mirror initially be spherical, that the combination of the curvature and the diffractive coating be such that the first diffractive waveplate coated mirror image the diffractive waveplate lens on the second diffractive waveplate coated mirror for paraxial rays at all wavelengths within the operating spectral bandwidth.

The fourth step 904 is to set the initial coefficients describing both the curvature and the phase profile of the diffractive waveplate coatings of the second diffractive waveplate coated mirror. This can be done by requiring that the mirror initially be spherical, that the system focal point be at a specified distance from the apex of the mirror, and that paraxial rays for all wavelengths within the operating wavelength band converge to the system focal point. The distance between the apex of the second diffractive waveplate coated mirror and the system focal point 406 in FIG. 4 can be set to a value determined by the requirement that the mirror be manufacturable, and that the field of view over which the optical system achieves acceptable resolution be acceptably large.

At this point in the design process, paraxial rays from a distant on-axis target for all wavelengths within the operating wavelength band all intersect the first diffractive waveplate coated mirror at the same radius, and all pass through the system focal point. However, other rays will in general not satisfy either of these two criteria. Specifically, rays of various wavelengths within the operating wavelength band, incident on the objective lens at radii other than at radii near the center of this lens, will not all pass through the system focal point. The purpose of the optimization step 905 in FIG. 9 is to adjust the curvatures and the phase profiles of the diffractive waveplate coatings on the two diffractive waveplate coated mirrors in order to minimize the root mean square a (RMS) radius of rays at all radii within the clear aperture of the system reaching the system focal point. This optimization can be performed with an optical design program such as Zemax. In this optimization, rays of radiation at various wavelengths within the operating wavelength band, incident on the objective lens throughout its clear aperture from a distant on-axis target, are traced through the optical system. The sag of each of the two diffractive waveplate coated mirrors, and the phase profile of the diffractive waveplate coatings on each of those mirrors, are all expanded in polynomial expansions in the radial coordinate, and the coefficients of the polynomial expansions in the radial coordinate of the sags of each mirror, and of the phase profiles of the diffractive waveplate coatings on the two diffractive waveplate coated mirrors, are adjusted so as to minimize the polychromatic spot size at the system focal point. In accordance with step 906 in FIG. 9, optimization stops when some predetermined performance is achieved. Here the criterion for the performance to be acceptable is that the polychromatic RMS spot size at the system focal point is reduced to a predetermined level, for example to below the diffraction limit.

If the optimization step 905 of FIG. 9 does not result in sufficient reduction of the RMS spot size at the focal point, step 907 of FIG. 9 allows for the possibility to try alternative axial spacings and diameters of the diffractive waveplate coated mirrors.

At the conclusion of the design process described above, and outlined in FIG. 9, it was found that it was possible to arrive at a design of a telescope with a 20 meter aperture diameter, with diffraction-limited performance over a spectral band that includes a significant portion of the visible spectrum, or more specifically, over a band of wavelengths from 520 nm to 600 nm. The same design technique can be used for other applications by starting with different initial conditions, but using the same design method outlined in FIG. 9.

Figure 10:
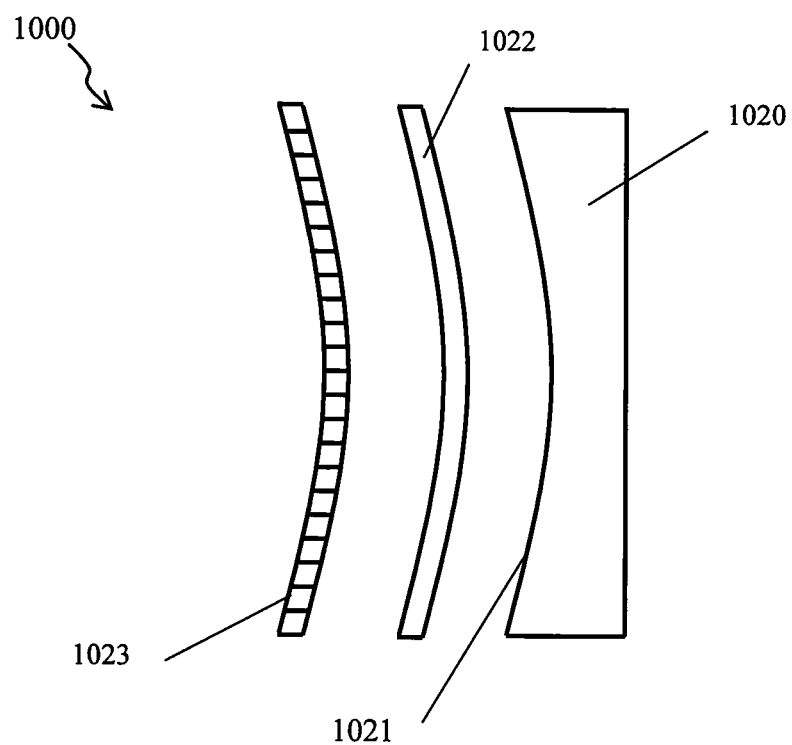
FIG. 10 illustrates the structure of a diffractive waveplate coated mirror, showing the diffractive waveplate coating and the quarter-wave coating.

An example of a diffractive waveplate coated mirror shown in FIG. 10 comprises a mirror 1020, a phase retarder coating 1021 conforming the mirror shape, and diffractive waveplate coating 1023 conforming to the mirror shape. The diffractive waveplate coating may comprise multiple layers for broadband or multispectral performance. Both the mirror shape and the structure of the diffractive waveplate coating are determined for each application following the method summarized in FIG. 9.

In the layout of FIG. 3, there is no central obscuration because the optical path is unfolded. In the layout of FIG. 4, on the other hand, the reflected beam from the first diffractive waveplate coated mirror 403 is folded out of the path of the incoming beam from the objective lens 402, but the photodetector or photodetector array 406 would partially obscure rays from the first diffractive waveplate coated mirror 403 to the second diffractive waveplate coated mirror 405. However, an artisan with ordinary skill in the art of optical design could employ slight variations of the method of FIG. 9 to produce designs with various foldings of the optical path, but with essentially equivalent optical performance.

Figure 11:
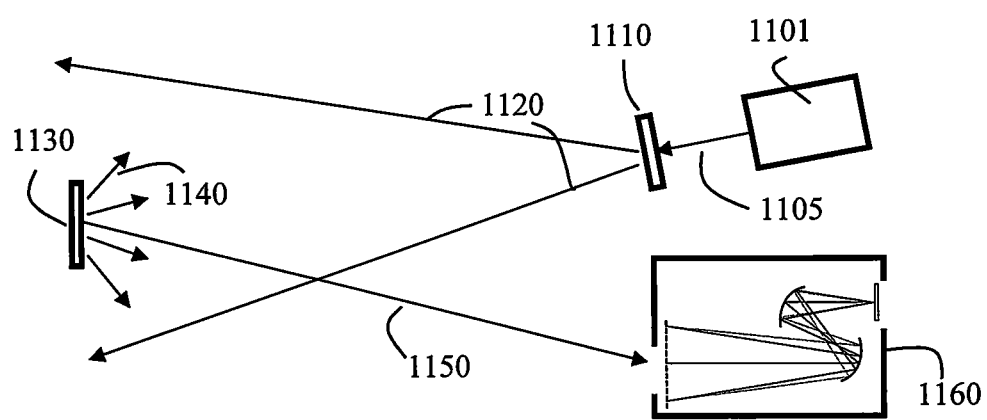
FIG. 11 is a schematic of an active imaging concept employing an imaging system of the present invention, that is, a system in which the illumination is artificially provided by a light source such as a laser or light emitting diodes.

In an alternative embodiment of the current invention shown in FIG. 11, the target 1130 being imaged is illuminated by a light source 1101 that may contain wavelengths in more than a single spectral band. In some embodiments, the light source may be a laser. The light 1105 emitted by the light source is shaped by beam shaper 1110. Examples of beam shapers include lenslet arrays and diffusers. In a preferred embodiment, beam shapers are thin film diffractive waveplate films coated, for example, at the output window of the laser. In another preferred embodiment, the beam shapers are reconfigurable, particularly, electrically switchable between different optical conditions, for example, between different beam divergent conditions or different shapes. Some of the rays of light 1120 from the output of the beam shaper are scattered by the target. Some of the scattered light 1140 is collected by the imaging system 1160. The advantage of such "active imaging" is that imaging can be performed at long distances and it does not rely as much on ambient light.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for fabricating an imaging system with diffractive waveplate coated mirrors correcting chromatic aberrations of a diffractive waveplate objective lens in an imaging system, comprising the steps of:

selecting a diameter and focal length of the diffractive waveplate objective lens;

selecting axial apex spacings and the diameters of the diffractive waveplate coated mirrors so that there is no vignetting for either of the diffractive waveplate coated mirrors for an entire operating wavelength range;

selecting polynomial expansion coefficients for both curvature and phase profile of a first diffractive waveplate coatings of a first diffractive waveplate coated mirror so that an objective diffractive waveplate lens is imaged onto a surface of a second diffractive waveplate coated mirror at all wavelengths within an operating bandwidth of the imaging system for paraxial rays;

setting polynomial expansion coefficients for both curvature and phase profile of a second diffractive waveplate coating of a second diffractive waveplate coated mirror, by having an imaging system focal point be at a selected distance from an apex of the second mirror, and that all wavelengths within the operating band converge to the imaging system focal point for paraxial rays; and adjusting the polynomial expansion coefficients for the curvatures and phase profiles of the first and second diffractive waveplate coated mirrors in order to bring all rays incident over an entire clear aperture of the objective lens to the same imaging system focal point.

2. The method of claim 1 wherein the imaging system is a telescope.

3. The method of claim 1 wherein the imaging system is augmented reality glasses.

4. The method of claim 1 wherein the imaging system is a binocular.

5. The method of claim 1, further comprising the steps of:
providing a light source;
providing a beam shaping system for forming an illuminated area; and
providing an imaging sensor in the focal point of the imaging system.

6. The method of claim 5 wherein said light source emits radiation at wavelengths within a spectral band selected from at least one of ultraviolet, visible, near infrared, short wave infrared, mid-wave infrared and long-wave infrared wavelengths.

7. The method of claim 5 wherein said light source is a laser, which emits radiation at wavelengths within the spectral band of the imaging sensor, selected from at least one of ultraviolet, visible, near infrared, short wave infrared, mid-wave infrared, and long-wave infrared wavelengths.

8. The method of claim 7 wherein said imaging sensor includes:
a camera for collecting imaging data of the object within a spectral band selected from at least one of ultraviolet, visible, near infrared, short wave infrared, mid-wave infrared, and long-wave infrared wavelengths, wherein the camera captures imaging data when signals emitted by the laser light source of and reflected by the imaged object or scene are collected by said camera.

9. The method of claim 5 wherein said beam shaping system comprises: diffractive waveplate optics.

10. The method of claim 9 wherein said diffractive waveplate optics is electrically switched between states with and without optical power producing variable beam divergence or variable beam profile.

11. The method of claim 1, wherein both of said diffractive waveplate objective lens and said diffractive waveplate coated mirrors operate in a broad band of spectrum selected from at least one of: ultraviolet, visible, near infrared, short wave infrared, mid-wave infrared, and long-wave infrared wavelengths.

12. The method of claim 1, wherein both of said diffractive waveplate objective lens and said diffractive waveplate coated mirrors operate in multiple spectral bands selected from at least one of: ultraviolet, visible, near infrared, short wave infrared, mid-wave infrared, and long-wave infrared wavelengths.

13. The method of claim 1, wherein the diffractive waveplate coated mirrors further comprise
a phase retardation layer conforming to the reflective surface.

14. The method of claim 13, wherein said phase retardation layer is a quarter-wave plate.

* * * * *